(12) United States Patent
Finsterwalder et al.

(10) Patent No.: US 6,220,113 B1
(45) Date of Patent: Apr. 24, 2001

(54) ROBOT WITH SLOTTED CARROUSEL PLATE

(75) Inventors: Thomas Finsterwalder; Peter Unglert, both of Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 0 days.

(21) Appl. No.: 09/292,617

(22) Filed: Apr. 15, 1999

(30) Foreign Application Priority Data

Apr. 17, 1998 (DE) .............................................. 198 16 949

(51) Int. Cl.⁷ ..................................................... B25J 17/02
(52) U.S. Cl. ........................................... 74/490.02; 901/27
(58) Field of Search ........................... 74/490.01, 490.03; 901/23, 27, 28, 29, 1

(56) References Cited

U.S. PATENT DOCUMENTS

| | | | |
|---|---|---|---|
| 5,065,062 | * 11/1991 | Uehara et al. | 310/114 |
| 5,115,690 | * 5/1992 | Torii et al. | 74/479 |
| 5,437,207 | * 8/1995 | Zimmer | 74/490.02 |
| 5,881,604 | * 3/1999 | Miwa | 74/490.05 |
| 6,014,909 | * 1/2000 | Fiora | 74/490.02 |

* cited by examiner

*Primary Examiner*—David Fenstermacher
(74) *Attorney, Agent, or Firm*—Paul Vincent

(57) ABSTRACT

In order to simply introduction of cables extending out of the base of a robot the arms thereof, the invention provides for a robot having a base and a carrousel plate located thereon having an opening for passage of the cables, wherein the opening is configured as a slot (7, 8, 9) extending in an inward direction from the peripheral edge of the carrousel plate (3).

4 Claims, 1 Drawing Sheet

ROBOT WITH SLOTTED CARROUSEL PLATE

This application claims Paris Convention priority of DE 198 16 949.3 filed Apr. 17, 1998 the complete disclosure of which is hereby incorporated by reference.

BACKGROUND OF THE INVENTION

The invention concerns a robot having a base and a carrousel plate located thereon having an opening for passing cables.

Energy is supplied in robots for driving the individually movable arms of the robot as well as the robot hand and optionally as a power supply for a tool such as a welding tongs. The energy is passed from the stationery base of the robot via cables disposed either on the outside of the carrousel and of the arms of the robot or guided through same to the corresponding use locations. Passage of the cable out of the base is effected via an opening in the carrousel plate which is closed at all sides. When cabling the cables, which have a substantial length and as a bundle of cables a corresponding thickness and weight, must be guided from below through the opening and towards the outside. This is difficult. Furthermore, the opening must be substantial in size so that the plug and connecting components provided for on the cable can also pass through the opening.

It is therefore the purpose of the invention to simplify assembly of the robot and in particular of the cabling as well as to facilitate a simple expansion of the cabling in particular for an installed robot.

SUMMARY OF THE INVENTION

The above mentioned purpose is solved in accordance with the invention in a robot of the above mentioned kind in that the opening is configured as a slot extending from the outer edge of the carrousel plate in an inward direction.

In accordance with the invention, the opening in the carrousel plate is not configured as an opening closed at all sides, rather is a slot extending from the edge region and therefore opened towards the edge. The cable must no longer be longitudinally inserted through the opening, rather sidewardly into the slot. In this manner assembly, in particular the cabling, is substantially simplified and more rapidly carried out than was previously the case. The solution in accordance with the invention facilitates a decoupling of the assembly of the mechanical components and of the cables. Furthermore, a simple expansion of the electrical installation is possible with an assembled carrousel. Although the slot can, in principle, extend at a slant relative to the radius of the carrousel plate, a preferred embodiment provides that the slot travels from the edge of the carrousel plate substantially radially in an inward direction. An improvement can thereby provide that the slot be L-shaped having sections substantially perpendicular to each other.

In a preferred embodiment, a cover plate is provided for which covers the edge region of the slot and which can be attached at the edge of the carrousel plate in a detachable fashion, wherein in particular, the cover plate can be configured as an angled plate. This facilitates sealing the outside of the slot which is otherwise open towards the edge region of the carrousel plate to prevent mechanical damage to the cable during operation due e.g. to welding chips.

Further advantages and features of the invention can be derived from the claims and from the subsequent description in which an embodiment is described with reference to the drawing.

DESCRIPTION OF THE PREFERRED EMBODIMENT

Figure 1:
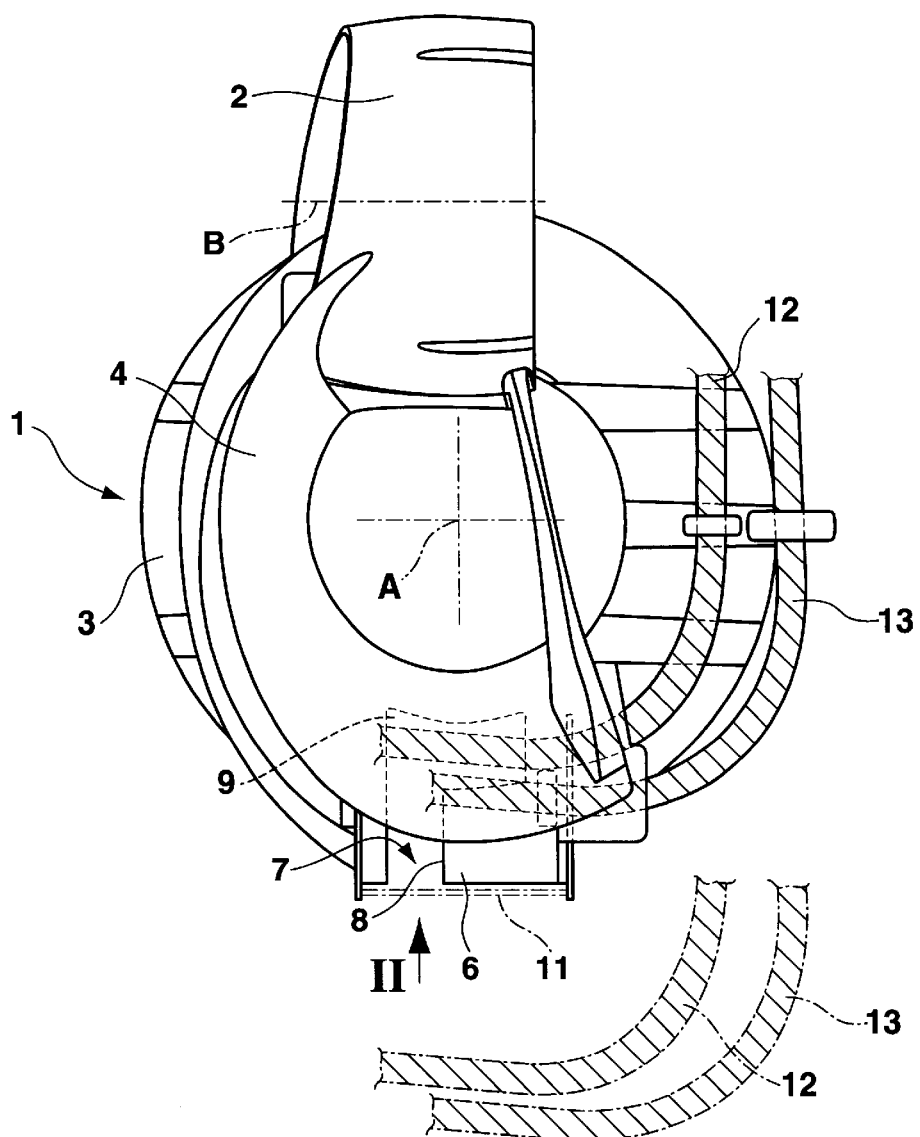
FIG. 1 shows a plan view of the lower portion of a robot having two cables prior to insertion into the base and following insertion therein.
Figure 2:
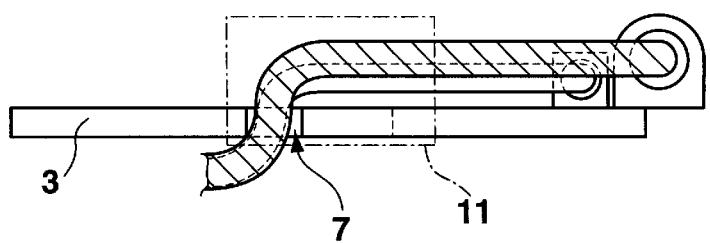
FIG. 2 shows a side view from the direction of arrow II in FIG. 1 of a carrousel plate having inserted cables.

FIG. 1 shows a plan view of the lower region of a robot, more precisely of the carrousel 1 of the robot which can rotate about a first vertical axis A. The drive motor for this motion about axis A can be disposed concentrically thereto. A shoulder 2 is disposed on the carrousel 1 to which a first arm is hinged which can be pivoted about the horizontal second axis B (the arm is not shown). The motor for pivoting this arm is normally concentric to axis B.

The lower end of the carrousel 1 has a carrousel plate 3 with which it is borne on a stationery base or foot of the robot and which is covered by the support structure 4 of the carrousel 1 in the representation of FIG. 1.

In the embodiment shown, a carrousel plate 3 has a slot 7 traveling from its edge 6 in an inward direction at its side facing away from the axis B, the slot initially traveling radially along a radial section 8 in an inward direction which is angled in an L-shaped fashion at its inner end via a tangential section 9. The slot 7 can be closed at its radially outward portion by means of a cover plate 11 which is preferentially configured as an angled plate. The cover plate 11 can be attached to the carrousel plate 3 in a detachable fashion using bolts.

This configuration facilitates cabling of the robot by insertion of a cable 12 for the additional motors located on the arm of the robot and, optionally for a power cable 13 for e.g. a welding tongs. After assembly these cables travel from inside of the base of the robot below the carrousel plate 3, in an outward direction to an arm of the robot in such a fashion that the cables 12, 13 can be inserted from the outer side of the carrousel plate 13 into the slot 7 until they gain access to the tangentially extending section 9 of the slot. In this fashion, a tedious threading through the hole of the carrousel plate of prior art, closed at all sides, is avoided. The outer portion 8 of the slot 7 can then be closed by a cover plate 11 by bolting same onto the carrousel plate 3.

In this fashion a simple and user friendly insertion of the cable 12, 13 is possible.

We claim:

1. A robot comprising:

a base; cables extending upwardly from said base; and a substantially horizontal carrousel plate disposed on said base, said carrousel plate having an opening for passage of said cables, said opening having a slot extending in an inward direction from a peripheral edge of said carrousel plate wherein said cables age inserted into said opening by disolacing said-cables through said slot in a direction which is substantially parallel to said carrousel plate and substantially perpendicular to an extension of said cables.

2. The robot of claim 1, wherein said slot extends substantially radially in said inward direction from said peripheral edge of said carrousel plate.

3. The robot of claim 1, wherein said slot is L-shaped having sections which are substantially perpendicular to another.

4. The robot of claim 1, further comprising a cover plate disposed at said peripheral edge of said carrousel plate in a detachable fashion to cover an edge region of said slot.

* * * * *

UNITED STATES PATENT AND TRADEMARK OFFICE
CERTIFICATE OF CORRECTION

PATENT NO. : 6,220,113 B1
DATED : April 24, 2001
INVENTOR(S) : Finsterwalder, Thomas It is certified that error appears in the above-identified patent and that said Letters Patent is hereby corrected as shown below:

Column 2,
Lines 1-57, correct claim one to read as follows:

1. A robot comprising:

a base;
    cables extending upwardly from said base; and
    a substantially horizontal carrousel plate disposed on said base, said carrousel plate having an opening for passage of said cables, said opening having a slot extending in an inward direction from a peripheral edge of said carrousel plate wherein said cables are inserted into said opening by displacing said cables through said slot in a direction which is substantially parallel to said carrousel plate and substantially perpendicular to an upward extension of said cables.

Signed and Sealed this

Twenty-third Day of July, 2002

*Attest:*

JAMES E. ROGAN
*Attesting Officer*     *Director of the United States Patent and Trademark Office*